United States Patent [19]

Maier

[11] Patent Number: 5,201,421
[45] Date of Patent: Apr. 13, 1993

[54] PACKAGING CONTAINER FOR HOLDING A PLURALITY OF ARTICLES

[75] Inventor: Hans Maier, Weisenthal, Fed. Rep. of Germany

[73] Assignee: Jacobs Suchard AG, Zurich, Switzerland

[21] Appl. No.: 826,730

[22] Filed: Jan. 28, 1992

[30] Foreign Application Priority Data

Jan. 29, 1991 [DE] Fed. Rep. of Germany ....... 4102569

[51] Int. Cl.$^5$ .............................................. B65D 19/00
[52] U.S. Cl. .................................. 206/600; 206/593; 229/120.31; 229/120.25
[58] Field of Search ............... 206/320, 326, 386, 564, 206/593, 600; 108/56.1; 229/120.25, 120.31, 120.36; 217/13, 16

[56] References Cited

U.S. PATENT DOCUMENTS

| | | | |
|---|---|---|---|
| 930,835 | 8/1909 | Brown | 229/120.31 |
| 1,456,098 | 5/1923 | Doane | 206/593 |
| 1,704,948 | 3/1929 | Maston | 229/120.36 |
| 3,628,718 | 12/1971 | Broyles | 229/120.31 |
| 4,454,946 | 6/1984 | Yokowo | 229/120.38 |
| 4,643,314 | 2/1987 | Kidd | 206/600 |
| 4,697,699 | 10/1987 | Schneider | 206/600 |
| 4,763,787 | 8/1988 | Koenig | 206/600 |
| 5,004,102 | 4/1991 | Timmins et al. | 206/386 |

FOREIGN PATENT DOCUMENTS

| | | | |
|---|---|---|---|
| 272661 | 11/1988 | Japan | 206/386 |
| 685567 | 9/1979 | U.S.S.R. | 206/593 |
| 2150533 | 7/1985 | United Kingdom | 206/386 |

*Primary Examiner*—David T. Fidei
*Attorney, Agent, or Firm*—Linn I. Grim

[57] ABSTRACT

A packaging container for holding a plurality of articles. Packaging containers of this kind serve as transport and display means for a plurality of packed articles. These articles are sold directly from the packaging container. The empty packaging containers are usually destroyed, because their material and their structure do not permit repeated usage. The invention is concerned with providing a reusable packaging container of this kind. The described packaging container comprises a base part (11) and a stack top (12) which is releasably connected to the base part (11) and which can be collapsed and/or folded together, preferably in such a way that the collapsed or folded stack top (12) can be placed on the base part (11). As a result, empty packaging containers can be returned in a space-saving manner and, if required, they can be refilled, which means they are reusable. The packaging container according to the invention is particularly suitable for holding several stacks of superposed packs of confectionery, particularly chocolate bars (10).

3 Claims, 5 Drawing Sheets

PACKAGING CONTAINER FOR HOLDING A PLURALITY OF ARTICLES

BACKGROUND OF THE INVENTION

The invention relates to a packaging container for holding a plurality of articles such as chocolate bars which comprises a base part and a stack top.

Packaging containers of this kind are known in the art as shop display containers. They serve as transport and display means for articles, particularly for packaged confectionery such as chocolate bars, which are arranged inside the container in the form of several stacks. These goods are delivered inside the packaging containers to retailers and are sold to customers directly out of these containers.

In general, prior art packaging containers of this kind only permit a single use. Consequently, the packaging containers have to be disposed after the goods have been sold.

The pallet-like packaging containers are quite large which means that their disposal creates a considerable amount of waste.

SUMMARY OF THE INVENTION

The invention is therefore based on the object to provide a packaging container of the afore mentioned kind which is easily reusable.

To attain this object, a base part and a stack top of the packaging container are releasably connected to one another and the stack top is collapsible or foldable. Since the stack top can be taken off the base part, the base part itself, which only requires relatively little space, can be easily returned in order to be used again. Since the stack top can be collapsed and erected, it can also be returned without the loss of space and can then be reconnected to the base part. Thus, the whole packaging container is reusable.

According to a preferred embodiment of the invention, the stack top is collapsible or foldable in such a way that the surface area of the collapsed or folded stack top approximately corresponds to the surface area of the base part, and preferably, it is slightly smaller. Thus, the collapsed or folded stack top can be placed on or into the base part and the complete packaging container can be returned without the loss of space.

According to the invention, the stack top comprises several vertical partition walls. Some of these partition walls are pivotable about at least one preferably central (hollow) column. The column stabilizes the stack top and facilitates a pivoting of the partition walls in order to collapse and/or fold the stack top. Erecting the stack top is also facilitated by the column.

The column is preferably formed from two side-by-side part columns which are joined to one another in such a way that, starting from their confronting sides, the two part columns can be pivoted away from one another in order to fold together the stack top. In this process, the two part columns are collapsed, i.e. they loose their three-dimensional shape and assume a flat shape which only requires minimum space.

The part columns are joined to one another via two sides, which are located in juxtaposition in a common plane, by means of a portion of the stack top which forms two partition walls. This portion of the stack top also comprises a center folding line which forms a center hinge axis. This axis is located between the juxtaposed side faces of the interconnected part columns and allows to centrally fold together the collapsed stack top (approximately in a V-shaped manner). As a result, the surface area of the collapsed or folded stack top can be halved.

Expediently, the unfolded or erected stack top is connected to the base part via at least one plug connection. This connection is preferably formed from depressions which correspond to the outlines of the stack top. Thus, lower edge portions of the stack top can be easily and reliably inserted into the base part in a positive manner.

Within the base part, there are supports for the articles which are to be stacked up against the partition walls of the stack top. These supports downwardly incline towards the center column so that the articles are pressed against the partition walls of the stack top or the column. Consequently, the incline of the supports ensures that the articles which are stacked on top of one another are securely held in the packaging container. Even relatively high stacks of superposed articles can not collapse and fall out of the container.

The larger supports are divided into several support surface parts whose surface area preferably corresponds to that of a stack of articles which are to be arranged on top of one another. On the one hand, this results in an imbricated arrangement of the articles of individual side-by-side stacks, which increases the stability of the stacks, while, on the other hand, the inclined arrangement of the support surface parts only creates a small wasted space in the form of a cavity underneath the supports.

According to a preferred embodiment of the invention, the base part comprises an outer portion and at least one inner portion. Such a base part is particularly easy to manufacture, because the separate inner portion can be easily provided with the inclined supports or support surface parts for the articles which are to be stacked in the packaging container. Moreover, the depressions in which the unfolded stack top is to be inserted can be formed in the inner portion by simple longitudinally and transversely directed slots. The inner portion can have a single-piece or a multi-piece structure. In the case of a multi-piece inner portion, the individual parts extend in those regions of the base part which are either located between two parallel partition walls or between two partition walls which are located at right angles to one another (in corner regions of the packaging container).

It is another essential feature of the invention that the whole packaging container is made of a durable material which allows a repeated use of the container. Preferably, the base part as well as the stack top are made of plastic, preferably of a thermoplastic material. This choice of material makes the packaging container according to the invention particularly durable and thus near enough infinitely reusable. Moreover, the packaging container according to the invention can be manufactured particularly easy by means of deep-drawing, injection molding and/or by means of cutting its portions out of semi-finished sheets.

BRIEF DESCRIPTION OF THE DRAWINGS

A preferred embodiment of the packaging container according to the invention will be described below in detail with reference to the drawings, in which.

DETAILED DESCRIPTION OF THE PREFERRED EMBODIMENT

Figure 1:
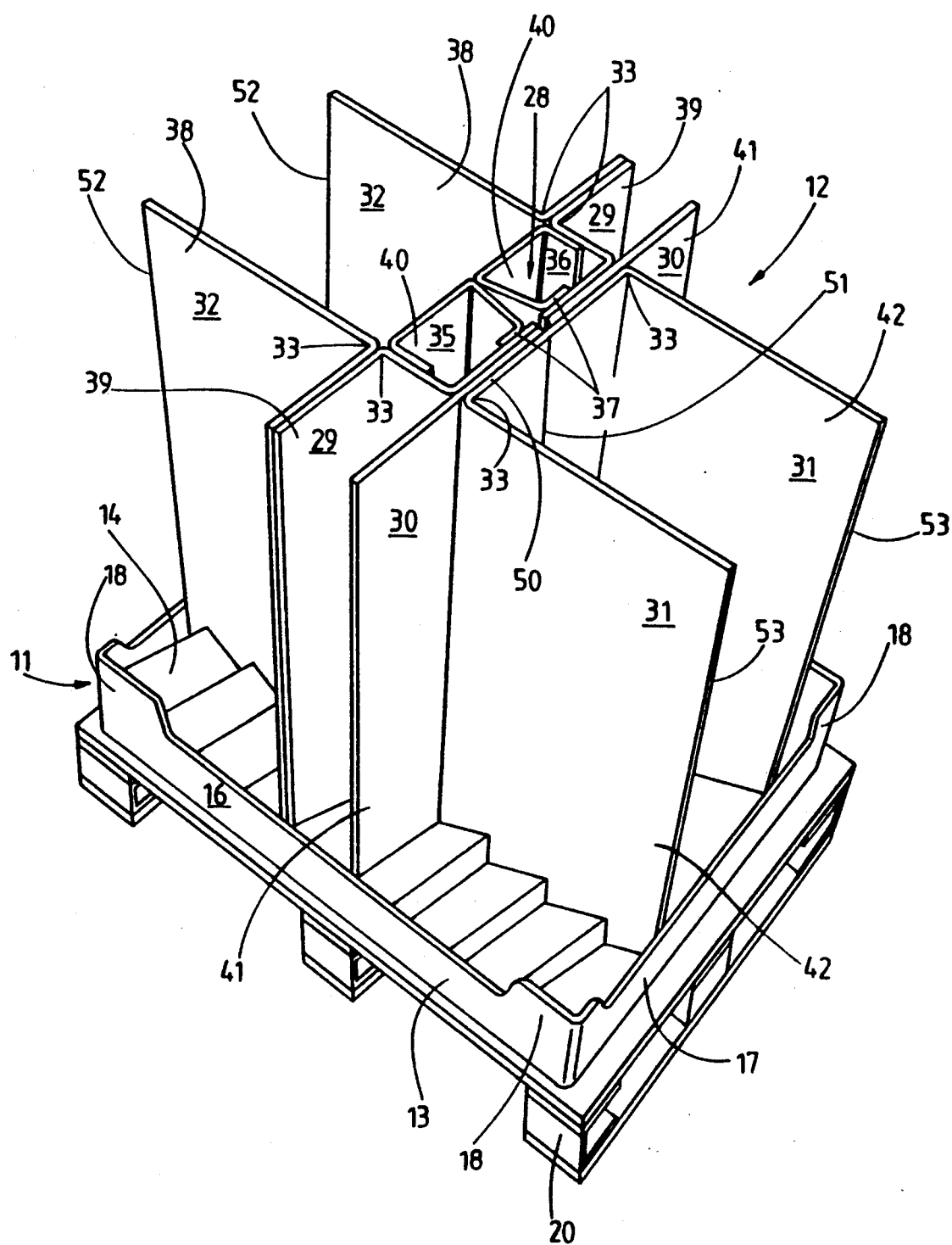
FIG. 1 is a perspective view of a packaging container arranged on a pallet, shown in an erected but empty condition.
Figure 2:
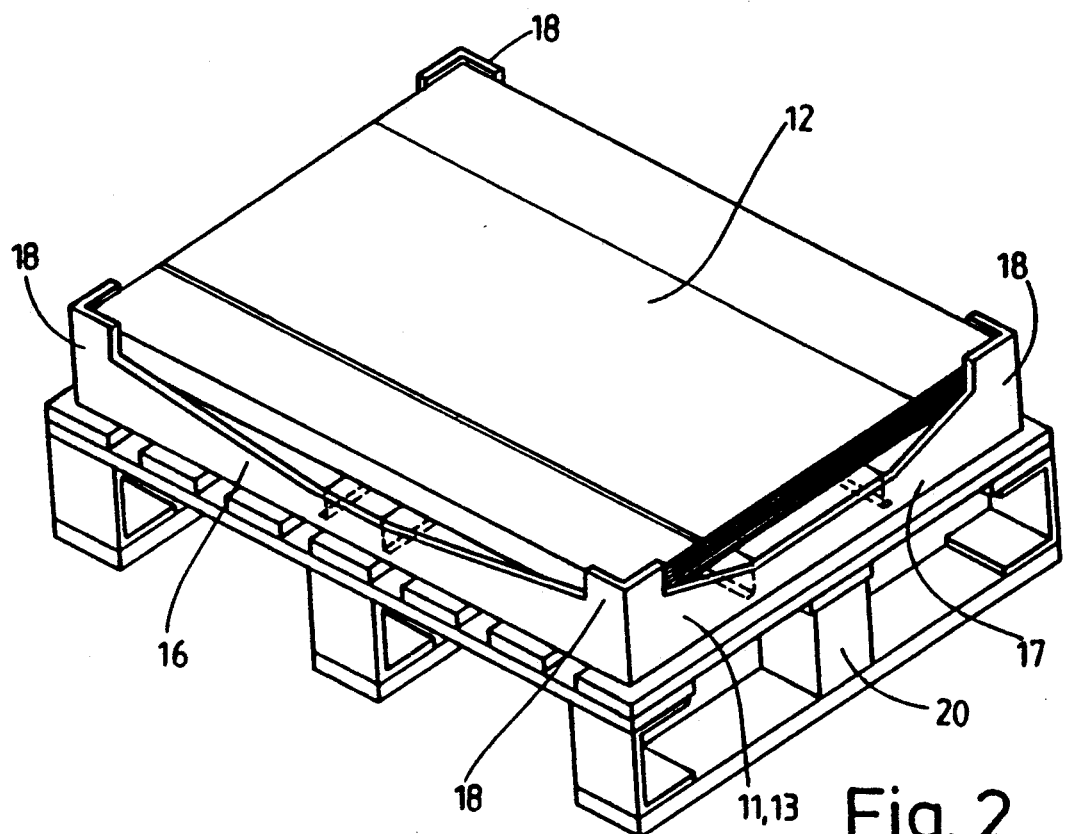
FIG. 2 shows the packaging container of FIG. 1 in a disassembled condition in which the stack top is folded together.

The invention relates to a packaging container in the form of a reusable shop display. Articles such as chocolate bars 10 are packed in the container and delivered to retailers where they are directly sold to customers from the container. The packaging container is designed such that it can hold several stacks of a plurality of superposed chocolate bars 10. The outer sides of the packaging container are open and offer easy access to the chocolate bars 10 packed therein (FIG. 1).

The packaging container comprises a base part 11 and a collapsible stack top 12 which is releasably connected thereto.

In the packaging container illustrated in the drawings, the base part 11 is made from two portions specifically an outer portion 13 and an inner portion 14.

Figure 4:
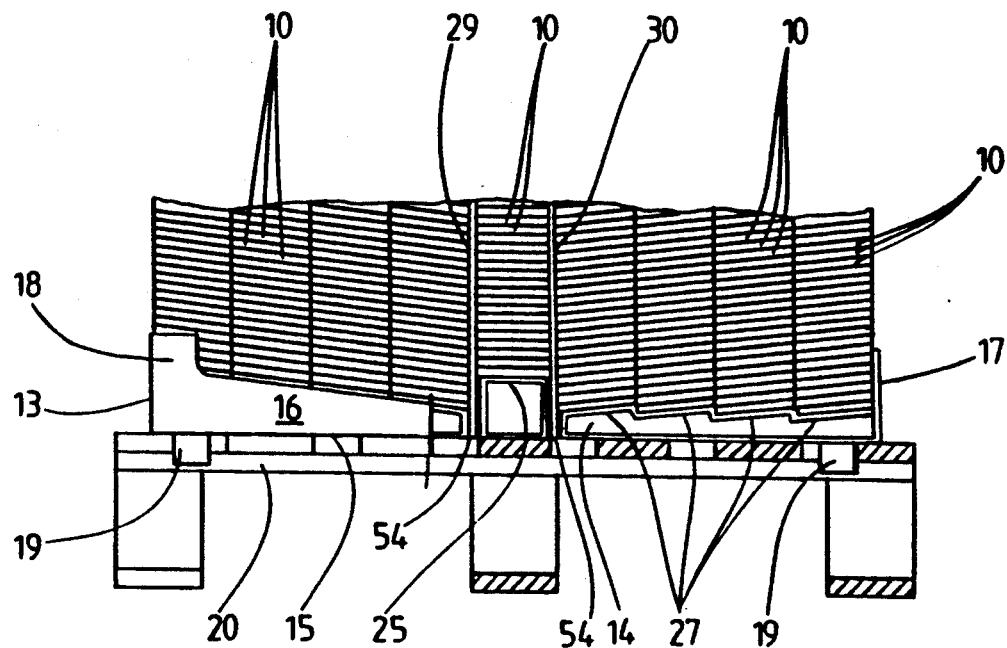
FIG. 4 is a section of the base part of FIG. 3, taken along the line IV—IV.
Figure 5:
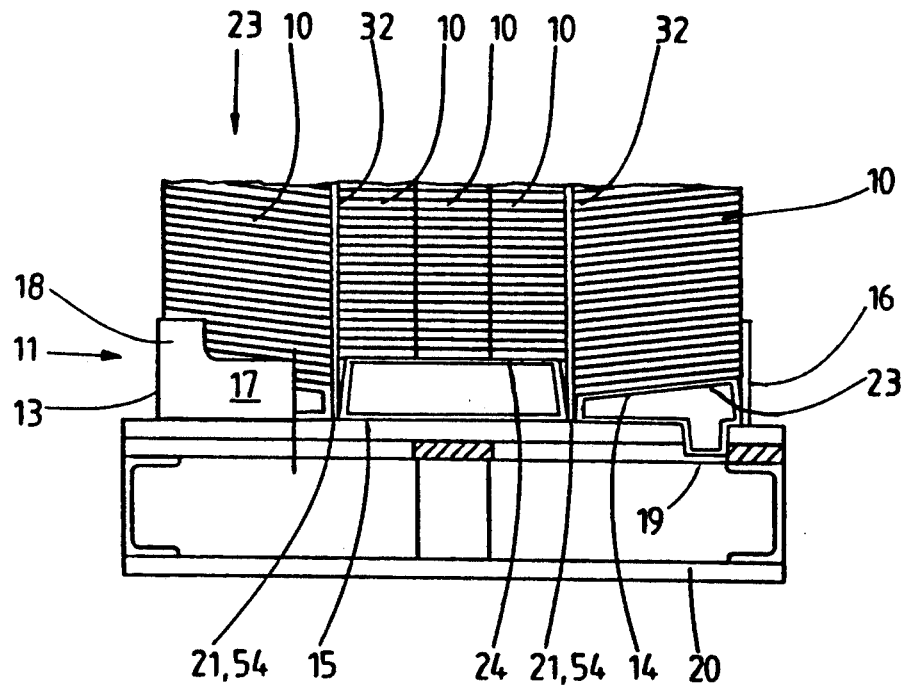
FIG. 5 is a section of the base part of FIG. 3, taken along the line V—V.

The outer portion 13 of the base part 11 has the shape of a box with low rims and an open top. Accordingly, the outer portion 13 has a closed bottom 15 which in this case has a rectangular surface area and (low) side panels 16 and transverse panels 17 adjoining the edges of the bottom 15. These panels are at right angles to the bottom 15 and completely surround this bottom 15. Corner portions of the side panels 16 and transverse panels 17 are upwardly extended in order to form stacking corners 18 (FIG. 1). Projections 19 which correspond to the stacking corners 18 are arranged underneath the bottom 15. In the present embodiment, the projections 19 are in the form of L-shaped ribs which are set back relative to the edge of the bottom 15 by the panel-thickness of the stacking corners 18 (FIGS. 4 and 5). As a result, several base parts 11 can be stacked on top of one another, such that, on the one hand, the projections 19 and, on the other hand, the stacking corners 18, form a lock which secures the stacked base parts 11 against transversely directed relative displacements. Moreover, the projections 19 underneath the bottom 15 of each outer portion 13 secure the packaging container with its base part 11 on a standardized pallet 20 (FIG. 1) against displacements. For this purpose, the projections 19 enter depressions in the top side of the pallet 20.

Figure 3:
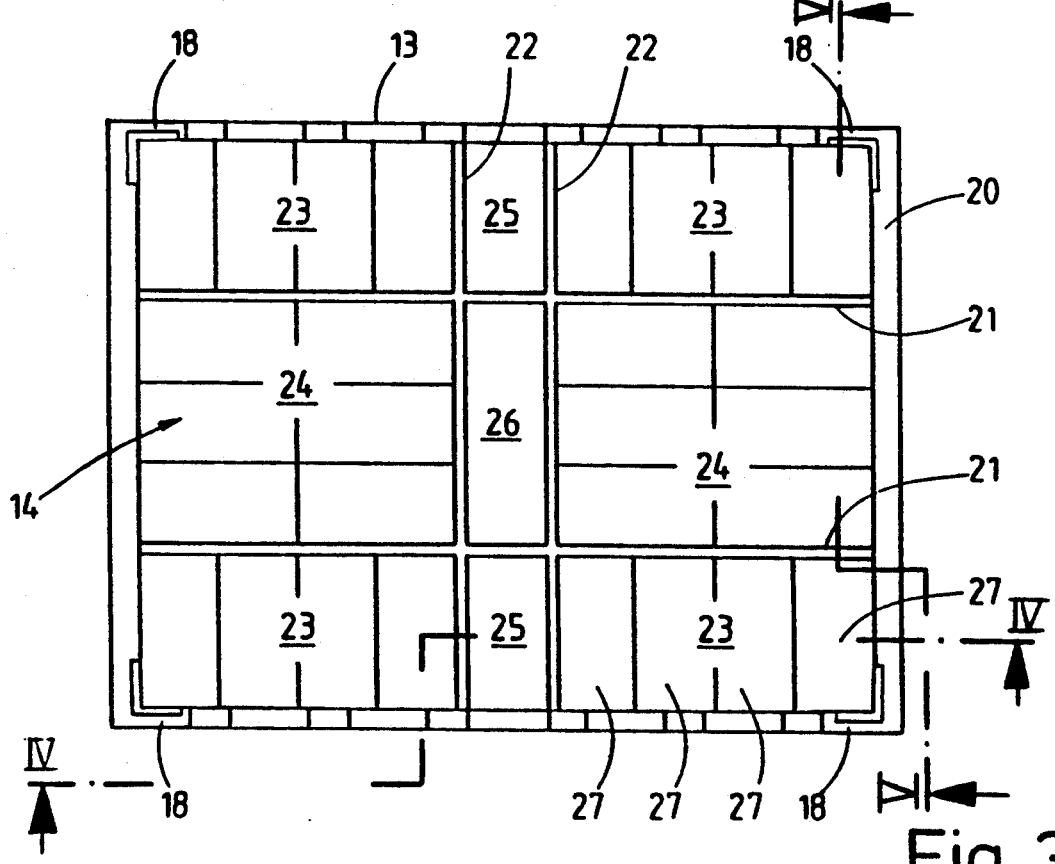
FIG. 3 is a top plan view of a base part of the packaging container.

The inner portion 14 is formed like an insert which is placed inside the outer portion 13 and is positively held therein between the side panels 16 and transverse panels 17. The inner portion 14, which in the present embodiment is in the form of a single piece, is provided with continuous grooves extending from one side to the other, particularly with two parallel longitudinal grooves 21 and two parallel transverse grooves 22 (FIG. 3). These grooves divide the surface area of the inner portion 14 into altogether nine fields 23 to 26. The bottom of the longitudinal grooves 21 and transverse grooves 22 is defined by webs 54. These webs 54 connect the fields 23 to 26 of the inner portion 14 so that they form a single piece. The fields 23 to 25 form support surfaces for one or more stacks of chocolate bars 10. In the illustrated embodiment, each of the four identical corner fields 23 serves for holding four stacks, such that the longitudinal sides of the chocolate bars 10 abut one another. Each of the two fields 24 serve for holding six stacks which are located side-by-side and behind one another. Two small fields 25 hold one stack each. A center field 26 is surrounded by the outer fields 23, 24, 25 and remains free, i.e. it is not packed with articles, since it offers no access to the chocolate bars 10 (FIG. 3).

The supports of the fields 23, 24, 25 of the inner portion 14, on which the stacks of superposed chocolate bars 10 rest, incline towards the bottom 15 of the base part 11. This incline has been selected such that it is directed towards the flat bottom of the center field 26. As a result, the chocolate bars 10 in the packaging container are slightly inclined towards the center field 26, which prevents the stacks of superposed chocolate bars 10 from shifting towards the open outer sides of the packaging container and toppling over. The supports of the fields 24 have a continuous surface which is downwardly inclined towards the center field 26. The supports of the corner fields 23, on the other hand, are arranged in an imbricated manner. In particular, the supports of the fields 23 are formed from four consecutive support parts 27, each supporting one stack of superposed chocolate bars 10. Each support part 27 downwardly inclines towards the field 25, which gives the fields 23 a saw-toothed profile section (FIGS. 1 and 4). Moreover, the surface parts continuously incline towards the fields 24. As a result, the support parts 27 are on the whole directed towards the respective corner of the center field 26, so that the stacks of superposed chocolate bars 10 are held in a stable manner even in the corner fields 23.

Figure 6:
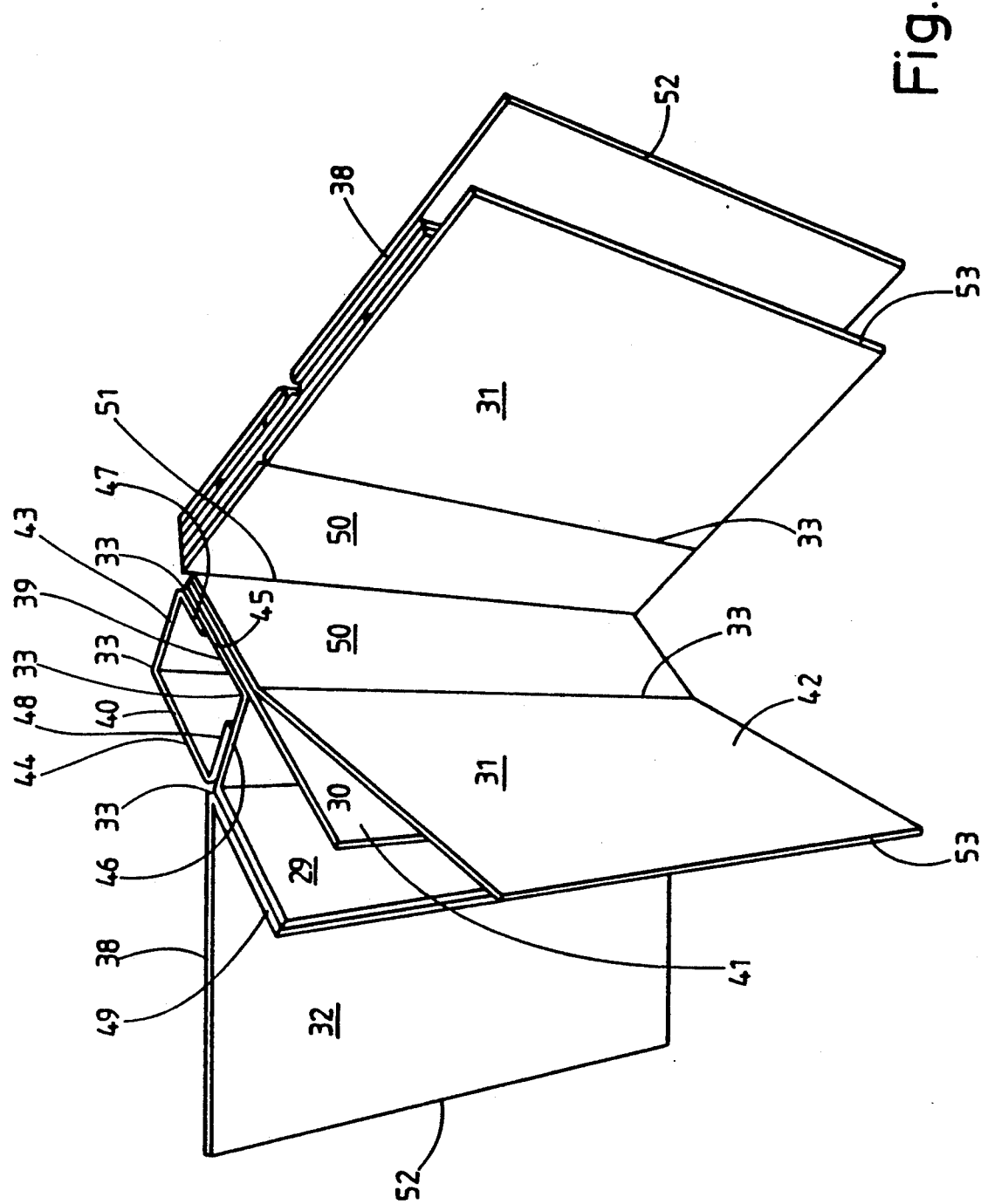
FIG. 6 is a perspective view of a stack top of the packaging container, shown in a partially folded condition.

The stack top 12 can not only be taken off the base part 11 but can also be collapsed or folded together thereafter. For this purpose, the stack top 12 comprises a center column 28 whose surface area corresponds to the surface area of the field 26. A partition wall 29, 30, 31 and 32 extends each side of the center column 28 at opposite ends. Altogether, the center column 28 is connected to four pairs of partition walls 29, 30, 31 and 32. According to the invention, the partition walls 29, 31, 32 are pivotable. In particular, they are hinged to the center column 28 by means of vertical hinge axes 33. The two partition walls 30, on the other hand, are rigidly joined to the center column 28. The partition walls 30 and the side of the center column 28 located between these two walls 30 form a folding surface 34. The pivotable partition walls 29, 31 and 32 which are hinged to the center column 28 can be moved against this folding surface 34 in order to collapse or fold together the stack top 12 (FIGS. 1 and 6).

The longitudinal grooves 21 and transverse grooves 22 in the inner portion 14 are defined such that their width and length corresponds to the outlines of the partition walls 29 to 32, so that the unfolded stack top 12 can be inserted into the longitudinal grooves 21 and transverse grooves 22 of the inner portion 14 from above.

It is an essential aspect of the invention that the center column 28 is centrally divided. For this purpose, the center column 28 comprises two hollow part columns 35 and 36 of equal size. The part columns 35 and 36 are joined to one another via two confronting vertical corners 37, i.e. via a corner 37 of the first part column 35 and an adjacent second corner 37 of the second part column 36 (FIGS. 1 and 6).

Figure 7:
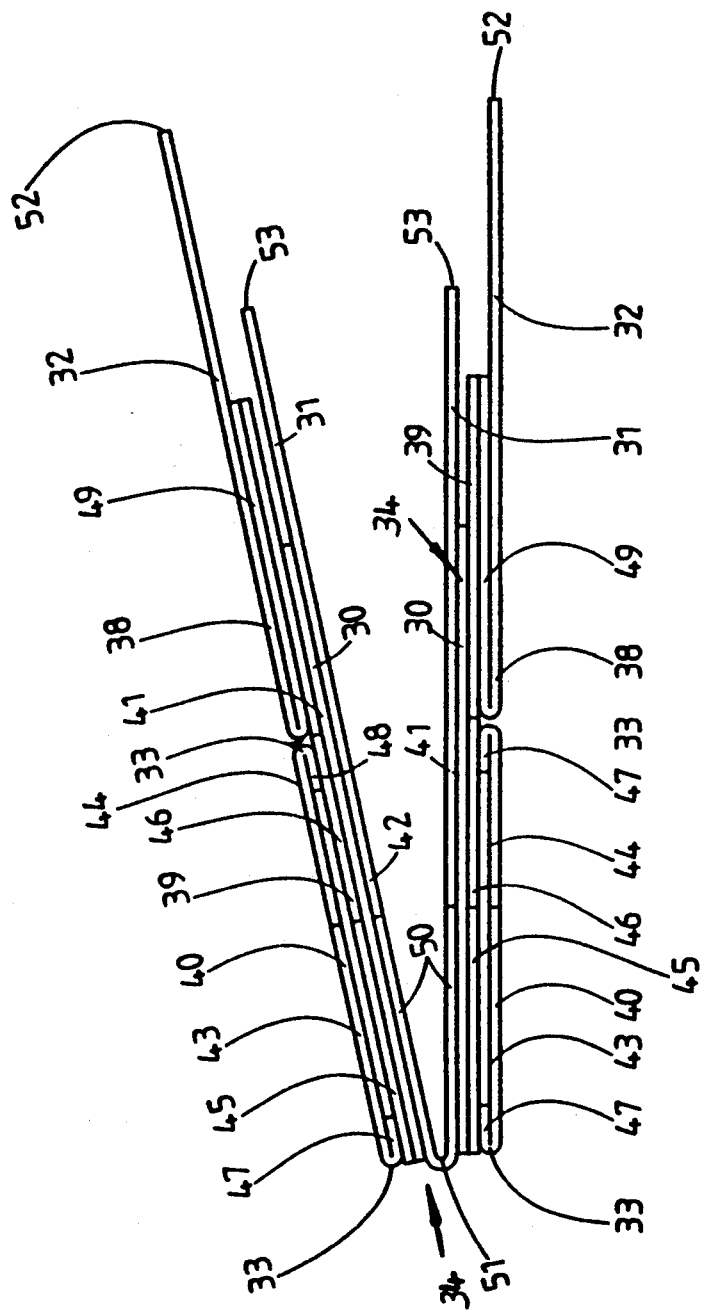
FIG. 7 is a top plan view of the partially folded stack top, on an enlarged scale.

The illustrated stack top 12 is formed from altogether nine blanks which are durably connected to one another. Eight blanks are formed from four pairs of different types of blanks 38, 39, 40, 41, while there is only a single fifth blank 42. The structure of the blanks 38 to 42 will be described in the following in detail with reference to the partially unfolded stack top (FIGS. 6 and 7):

Each part column 35 and 36 is formed from the blank 40 and a portion of the blank 39. The blank 40 is bent in an L-shaped manner, while the blank 39 extends in the form of a double-L or a Z. The L-shaped blank 40 forms two panels 43, 44 of the respective part column 35, 36, while two perpendicular legs of each blank 39 form the other two panels 45 and 46 of each part column 35, 36. The free ends of the legs of blank 40 which form the panels 43 and 44 are provided with connecting flaps 47 and 48. These flaps 47, 48 connect the panels 43 and 44 of the blank 40 with the panels 45 and 46 of the blank 39. A third leg of the blank 39 forms one half of the partition wall 29. A second half of this partition wall 29 is formed from a connecting flap 49 of the L-shaped blank 38. This connecting flap 49 completely overlaps the first half of the partition wall 29 and is connected thereto. A second leg of the blank 38 extends perpendicular to the connecting flap 49 of each blank 38 and forms a partition wall 32. The panels 45 of the part columns 35 and 36 are located next to one another in one plane and are each connected to a flat blank 41 in such a way that each blank 41 completely overlaps the panel 45 of the respective part column 35 or 36. Moreover, each blank 41 projects from the respective part column 35, 36 at both ends in order to form the partition walls 30. The blank 42 is formed in a U-shaped manner. As a result, two parallel legs of the blank 42 form parallel partition walls 31 of equal size. A web 50 of the blank 42 connects the partition walls 31 to one another. This web 50 corresponds in width to the side-by-side part columns 35 and 36 and overlaps the sections of the blank 41 which abut the part columns 35, 36. A vertical center hinge axis 51 centrally extends across the web 50 of the blank 41. This axis allows to fold the part columns 35 and 36 away from one another in the region of their corners 37 and to halve the overal surface of the collapsed or folded stack top 12.

The stack top 12 is collapsed by means of pivoting individual sections of the blanks 38, 39, 40 and 42 about their hinge axes 33 or the center hinge axis 51. The hinge axes 33 and the center hinge axis 51 are formed in the blanks 38, 39, 40 and 42 by embossing or the like, so that the blanks can be easily pivoted in a well-defined manner.

The stack top 12 is collapsed or folded together in the following way (FIGS. 6 and 7):

After the stack top 12 has been released from the base part 11, the Z-shaped blanks 39 are spread out flat by means of pulling their free ends. The blanks 39 are thus placed against the blanks 41 which are located in the folding plane 34 and which remain flat even in the erected state of the container. In this process, the blanks 40 are deformed such that the part columns 35 and 36 are spread out flat. Subsequently, the oppositely located partition walls 32 of the blanks 38 are folded in opposed directions so that their free edges 52 are directed away from one another. In like manner, the partition walls 31 of the blank 42 are moved in opposed directions so that their free edges 53 are located on opposite outer sides of the collapsed stack top 12. Thereafter, the collapsed stack top 12 is again folded in a V-shaped manner about the center hinge axis 51 in order to halve its surface area. The dimensions of the blanks 38 to 42 of the stack top 12 are defined such that in the folded or collapsed state, the stack top 12 has a rectangular surface area which corresponds to the inside dimension of the outer portion 13 of the base part 11. Thus, the folded stack top 12 can be placed on the inner portion 14 of the base part 11 such that it is positively held therein. If required, other collapsed packaging containers can then be placed with their base parts 11 on the stacking corners 18 of the bottom base part 11, so that a plurality of empty collapsed packaging containers can be returned in a space-saving manner to the place where they are filled.

Alternatively it would be possible to dispense with the connecting flaps 47 to 49 and the web 50 and to directly hinge the partition walls 29 to 32 to the respective corners of the part columns 35 and 36, for example by means of hinge straps which are glued to corner portions and form hinge axes 33. In this case, the center hinge axis 51 is also formed from a hinge strap which directly joins the confronting edges 37 of the part columns 35 and 36.

It is another essential aspect of the invention that the whole packaging container is made of plastic, preferably of a thermoplastic material. For this purpose, the outer portion 13 of the base part 11 is preferably made by injection molding, whereas the inner portion 14 of the base part 11 is preferably made by deep-drawing. Alternatively, the outer portion 13 could also be made by deep-drawing. The blanks 39 to 42, on the other hand, are preferably cut from a sheet-like pastic material. The hinge axes 33 and the center hinge axis 51 are embossed so that they form hinges. The blanks 39 to 42 are interconnected via their connecting flaps 47 to 49 by means of glueing, welding or the like.

I claim:

1. A packaging container for holding a plurality of articles, comprising:
   a base member; and
   a top member releasably connectable to the base member and including a multitude of blanks having a plurality of partition walls, and a plurality of connecting flaps connecting the blanks together,
   the top member being foldable between
   i) a first folded position in which the top member has a generally flat shape, and
   ii) an open position in which the blanks of the top member form a central vertical column, and the partition walls of the blank form a plurality of compartments for receiving the articles;
   wherein the blanks are connected together for pivotal movement relative to the central vertical column; and one of said blanks includes a central hinge axis, and the blanks are foldable about said central hinge axis from said first folded position and into a second folded position in which the top member also has a generally flat shape; and wherein when the top member is in the first folded position, the top member has a given surface area; and when the top member is in the second folded position, the top member has a surface area approximately half said given surface area.

2. A packaging container according to claim 1, wherein:

the base member forms an interior; and when the top member is in the second folded position, the top member fits in the interior of the base member.

3. A packaging container according to claims 1 or 2, wherein:

the central vertical column has left and right vertically extending sides; and the hinge axis is substantially vertical and is laterally located approximately midway between the left and right sides of the central vertical column.

* * * * *